W. WEATHERSBEE.
LOCOMOTIVE WHEEL.

No. 182,139.    Patented Sept. 12, 1876.

WITNESSES:
C. Neveux
John Goethals

INVENTOR:
W. Weathersbee
BY
ATTORNEYS.

UNITED STATES PATENT OFFICE.

WILSON WEATHERSBEE, OF SPRING GARDEN, ILLINOIS.

IMPROVEMENT IN LOCOMOTIVE-WHEELS.

Specification forming part of Letters Patent No. 182,139, dated September 12, 1876; application filed April 4, 1876.

*To all whom it may concern:*

Be it known that I, WILSON WEATHERSBEE, of Spring Garden, in the county of Jefferson and State of Illinois, have invented a new and Improved Locomotive, of which the following is a specification:

My invention consists of a simple method of gearing one or both of the driving-wheels of a locomotive, so that they can turn independently of each other in going around curves, and thus prevent sliding, as when both wheels are keyed fast to the axle.

Figure 1:
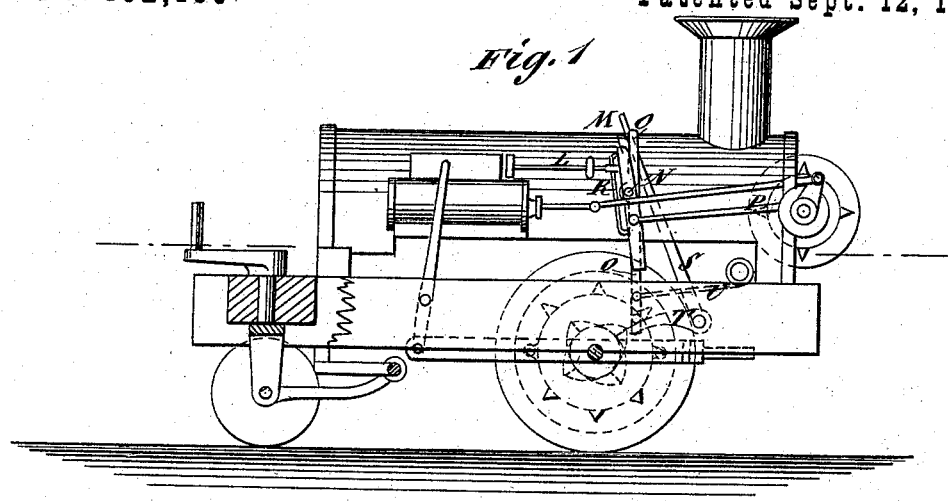
Figure 2:
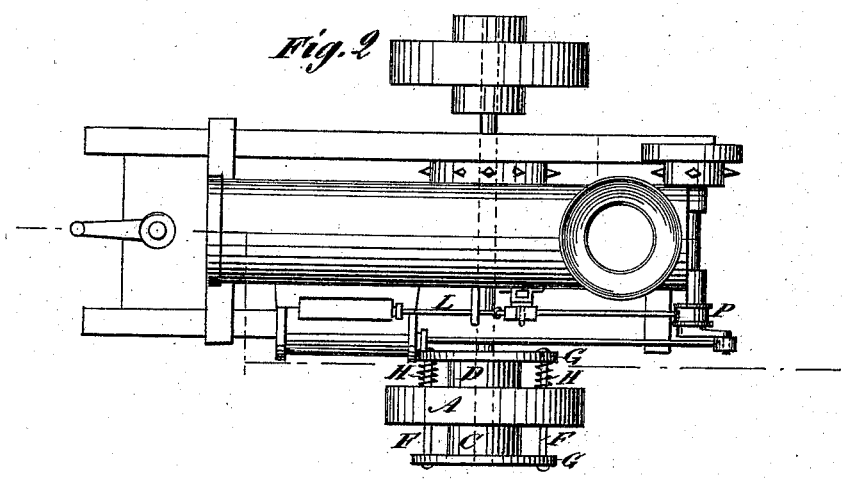
Figure 3:
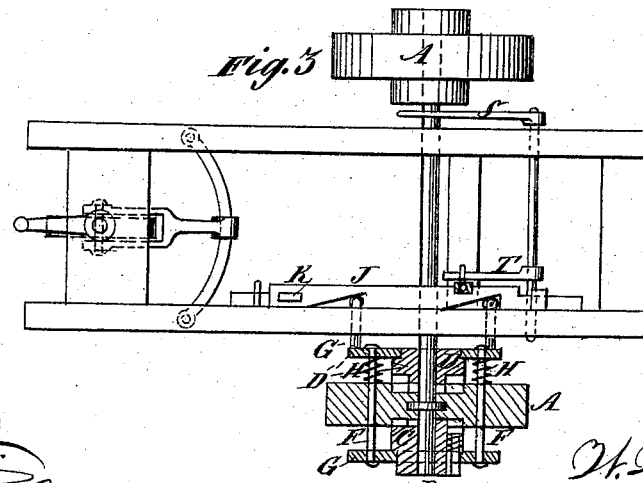

Figure 1 is a longitudinal sectional elevation of my improved locomotive, taken on the line $x$ $x$ of Fig. 2. Fig. 2 is a plan view, and Fig. 3 is a horizontal section.

Similar letters of reference indicate corresponding parts.

The driving-wheel A is fitted loosely on the axle B, and has a clutch, C, on one side, for driving it one way and letting it slip the other way, and a clutch, D, on the other side, for driving and slipping the reverse ways; and these clutches are connected by rods F and disks G, to be worked together, and they are worked in one direction by the springs H, and in the other direction by the cam-lever J and lever K.

One clutch drives in one direction, and the other in the other direction—that is to say, forward and backward—and both clutches allow the wheel to overrun them. For example, if the loose wheel is running on an outside curve it will turn faster than the axle, and thus overrun its driving-clutch; but if running on an inside curve, so that the axle turns faster than the wheel, the driving-clutch will be shifted out, and the clutch for driving in the reverse way will be shifted in, allowing the shaft to overrun the wheel.

The ratchet on either side of hub catches in the notches thereof, while a disk works on each block, being connected by three rods, which pass loosely through holes in hub. The hub being loose, and the disks as well as rods turning with the wheel, the ratchets are so set that the inside one holds wheel from turning forward, and the outside one from turning backward; but only one is allowed to engage the hub at a time. The coil-springs on rods, inside the hub, hold the disks inward, and allow the outer ratchet to engage, while the inner one is held away. In order to let the inner ratchet engage the hub and hold the outer one away, the two rods passing through main frame are forced out by lever, and driven against inner disk. This overcomes the spiral springs, pushes the disks out, and allows inner ratchet to engage hub, and hold outer one away.

Having thus described my invention, I claim as new and desire to secure by Letters Patent—

1. The combination of the clutches C D, shifting-springs H, and the sliding cam-bar J, with the wheel, fitted loosely on the shaft, substantially as specified.

2. The disks G and rods F, combined with the clutches C D and wheel A, substantially as specified.

WILSON WEATHERSBEE.

Witnesses:
JOHN WEATHERSBEE,
R. N. PRIGMORE.